(No Model.)

J. H. ADWEN.
STRAINER.

No. 365,560. Patented June 28, 1887.

WITNESSES:
Fred F. Church
Thomas Durant

INVENTOR
Joseph H. Adwen
BY Church & Church
ATTORNEYS.

N. PETERS, Photo-Lithographer, Washington, D. C.

UNITED STATES PATENT OFFICE.

JOSEPH H. ADWEN, OF ROCHESTER, NEW YORK.

STRAINER.

SPECIFICATION forming part of Letters Patent No. 365,560, dated June 28, 1887.

Application filed September 11, 1886. Serial No. 213,347. (No model.)

*To all whom it may concern:*

Be it known that I, JOSEPH H. ADWEN, of Rochester, in the county of Monroe and State of New York, have invented certain new and useful Improvements in Strainers for Liquids; and I do hereby declare the following to be a full, clear, and exact description of the same, reference being had to the accompanying drawings, forming a part of this specification, and to the figures and letters of reference marked thereon.

My invention relates to strainers for liquids, and has for its object to provide a cheap, light, and serviceable strainer particularly adapted for straining liquids of a viscid nature—such as paints, oils, &c.—that render a strainer after being poured through it substantially worthless, by reason of the interstices being filled with the dried and hard material; and to this end it consists of a strainer so cheaply constructed as to admit of its being thrown away after use, and yet one so serviceable as to separate all the impurities from the liquid.

It further consists in a certain device for holding the strainer in position over the vessel, and in certain novelties of construction, hereinafter pointed out.

Figure 1:
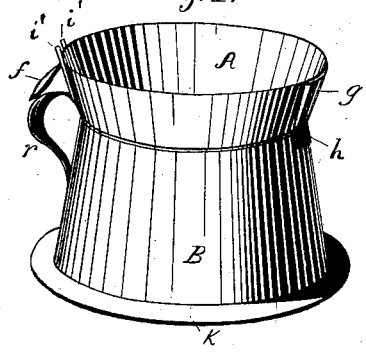
Figure 2:
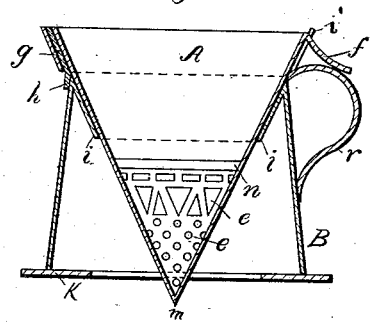
Figure 3:
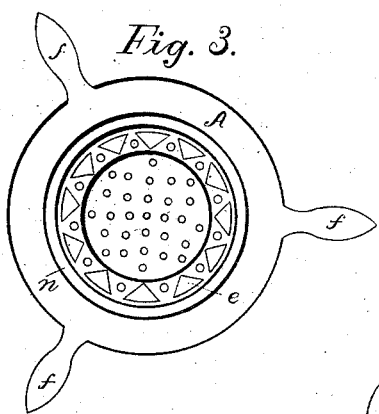
Figure 4:
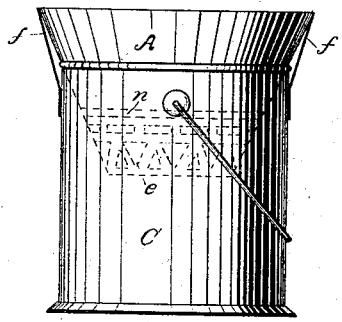
Figure 5:
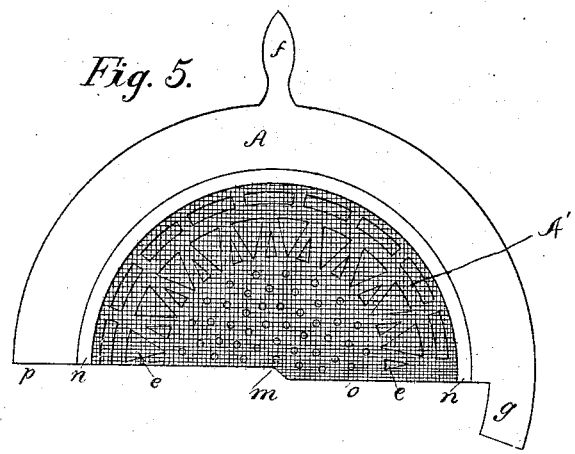

In the drawings, Figure 1 is a perspective view of a strainer and holder constructed in accordance with my invention; Fig. 2, a vertical section taken through the same; Fig. 3, a top plan view of a modification; Fig. 4, a view of the same applied to a pail; Fig. 5, a view of the blank from which the strainer in Fig. 1 is constructed.

Similar letters of reference in the several figures indicate the same parts.

My improved strainer consists, generally, of some straining material—such as cheese or bolting cloth—secured to a suitable backing of some cheap material—such as card-board—adapted to be bent into convenient shape, so as to be readily applicable to an ordinary pail or other receptacle, or adapted to be used in connection with a particular form of holder, if desired.

In Figs. 1, 2, and 5 I have shown the preferred form of strainer, the latter figure showing the blank A, from which it is constructed. This blank consists of a piece of card-board or heavy paper, preferably cut to the substantially semicircular shape shown, and provided on the curved side with the tongue or projecting portion $f$, and on one of its ends with a projection, $g$. The central portion of this blank is provided with a number of perforations, $e$, of any desired shape, sufficient material being left between them, so that the blank when bent into proper form will not lose its shape, and over this perforated portion is pasted or otherwise secured a semicircular section, A', of cheese-cloth or bolting-cloth, or any similar material, having a coarse or fine mesh, as desired.

A circular ring of paper or other material, $n$, may be secured over the edges of this cloth-section by means of paste, in order to prevent its displacement.

The side $o$ of the center of the blank A is a trifle larger than the other side, $p$, so that when the blank is bent up into the form of a cone, as in Fig. 2, it will overlap it, and may be secured by paste or any other suitable material, if desired. The projection, it will be noted, is on the longer side, and when lapped over the other it is secured at its base to it and at its end, the points where the paste is applied being indicated in Fig. 5, so that a loop will be formed, for a purpose to be described. When the blank is folded up into this shape, the point $m$ will form the apex of the cone.

In Figs. 1 and 2 I have showed a preferred form of device for holding the strainer just described, consisting of a tubular portion, B, and provided with an internal inclined ring, $i$, adapted to the angle of the strainer it is to hold, and having an annular portion, K, at the base, as shown. A suitable handle, $r$, is provided, having at the upper side thereof two small projecting arms, $i'$, between which the projection $f$ of the strainer is adapted to rest when in position, and at the side opposite the handle the holder is provided with an inclined projection or tongue, $h$, adapted to project through the loop formed by the projection $g$ on the strainer.

It will readily be seen from the foregoing that the blank A is first bent up into conical shape, the edges pasted together as shown, and the whole, when dry and adapted for use, placed in the conical recess formed by the ring $i$ in the holder, and held in place therein by the loop $g$ being placed over the projection $h$ and the projection $f$ being placed between the projections $i'$, as shown. This will serve to hold the strainer in position and prevent its being displaced by the pouring through it of the material being strained.

The holder forms a convenient rest for the strainer and permits it to be held in the hand or placed over the top of a pail, as desired, the flange K permitting this.

In Figs. 3 and 4 I have shown a strainer constructed in the form of a frustum of a cone, and, instead of employing the holder B in connection with it, I provide it with three projections, $f$, adapted to receive a coating of paste or adhesive material on their ends, so that they may be secured to the sides of the pail C or other receptacle, and the strainer thus be prevented from falling in.

Strainers constructed in accordance with my invention of paper or card-board and cheese-cloth, or similar material, are very simple, can be manufactured at small cost, and when once used may be thrown away, and are for this very reason especially adapted for straining paints, as after having been used once for this purpose and the paint allowed to dry in the meshes a strainer becomes practically worthless; but as mine is constructed of such cheap material it can be readily thrown away and another one employed.

If desired, the blanks, as shown in Fig. 5, may be cut and paste applied to the overlapping edge $o$ and the projection $g$ and dried and these sold, the user having simply to moisten the gum and fold the blank to the conical shape, as will be readily understood.

Instead of securing the strainer in position upon the pail or holder by the inclined ring $i$, as shown, the loops and projections may be relied upon to hold it in place or the projections $f$, as in Figs. 3 and 4.

Having thus described my invention, what I claim as new is—

1. The herein-described blank for forming strainers, consisting of the perforated semicircular piece of paper or similar material having the tongue and the piece of cloth or similar material secured on one side thereof, substantially as described.

2. The herein-described blank for forming strainers, consisting of the perforated semicircular piece of paper or similar material having the tongues $g$ and $f$ and the piece of straining material secured on one side thereof, substantially as described.

3. As an article of manufacture, the herein-described strainer, consisting of a cone of paper perforated, as shown, and provided on its inside with a covering of cloth, substantially as described.

4. As an article of manufacture, the improved strainer herein described, constructed of a single blank consisting of a perforated semicircular piece of paper or pasteboard provided on its inside with a covering of suitable straining material, the whole bent into conical shape, substantially as described.

5. As an article of manufacture, the improved strainer herein described, constructed of a cone of paper or similar material perforated and a section of straining material secured thereto, and having two or more projections at the sides adapted for attachment to a holder or vessel, substantially as described.

6. As an article of manufacture, a conical strainer constructed of paper or similar material perforated, as shown, a lining of straining material—such as cloth—secured thereon, and a ring of material covering the edge of the straining material, as set forth.

7. The combination, with a suitable holder having a projection at the side thereof, of a suitable strainer having a loop at the side for the reception of the projection and a projection for co-operating with the side of the holder, substantially as described.

8. The combination, with the holder having the projection on one side and the two pins on the other, of the strainer having the loop on the side for the reception of the projection on the holder, and the projection adapted to be placed between the two pins or on the holder.

9. The combination, with the holder having the inclined ring, of the strainer adapted to be placed therein, and having the projections for co-operating with the sides of the holder for preventing motion thereon, substantially as described.

JOSEPH H. ADWEN.

Witnesses:
SAMUEL L. SELDEN,
LEON M. VAN HOOREBEKE.